No. 729,442. PATENTED MAY 26, 1903.
H. E. STEVICK.
NUT LOCK.
APPLICATION FILED OCT. 4, 1902.
NO MODEL.
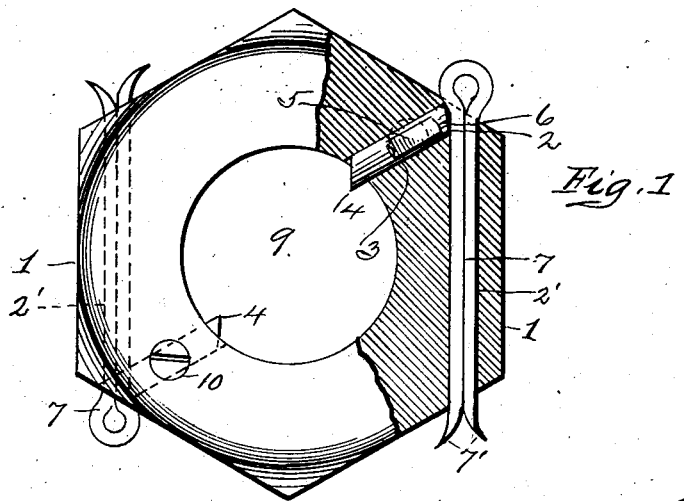
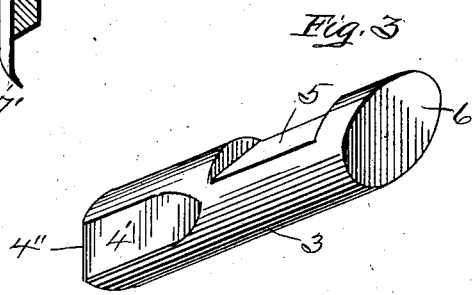
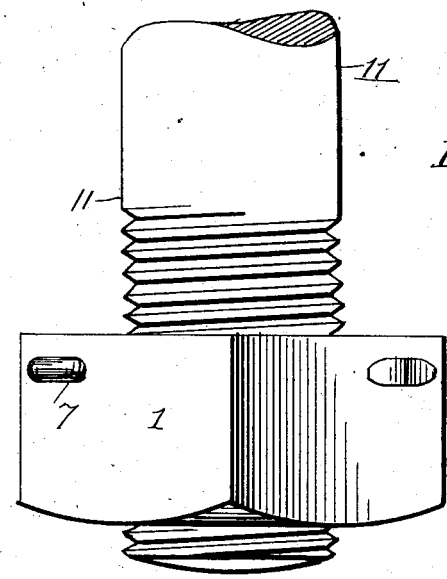

No. 729,442. Patented May 26, 1903.

UNITED STATES PATENT OFFICE.

HIRAM E. STEVICK, OF EVANS CITY, PENNSYLVANIA.

NUT-LOCK.

SPECIFICATION forming part of Letters Patent No. 729,442, dated May 26, 1903.

Application filed October 4, 1902. Serial No. 125,878. (No model.)

*To all whom it may concern:*

Be it known that I, HIRAM E. STEVICK, a citizen of the United States, residing at Evans City, in the county of Butler and State of Pennsylvania, have invented a new and useful Improvement in Nut-Locks, of which improvement the following is a specification.

My invention relates to an improved nut-lock.

The object of my invention is to provide an effective nut-lock that will lock the nut on the bolt so that it will not be worked off by vibration, and one in which the nut may be readily unlocked and removed from the bolt.

Finally, the object of my invention resides in providing a nut-lock that will be strong, durable, and efficient and one that will be simple to operate and inexpensive to produce.

Furthermore, my invention consists in the novel details of construction, a preferable embodiment of which is illustrated in the drawings, and described in the specification, and pointed out in the claims hereunto annexed.

Figure 1 is a top plan view, partly in section, showing the locking-pins in their relative positions. Fig. 2 is a side elevation showing my nut-lock applied to the end of a bolt, and Fig. 3 is a perspective view of the locking-pin.

In the drawings the numeral 1 designates the nut provided with channels 2 and 2', which are arranged at angles to each other and formed on one side or at opposite sides of the nut. The nut is provided with the usual screw-threaded opening and is formed in any suitable shape. Fitting in the channel 2 is a pin 3, provided at its one end with a rounded portion 6 and at its opposite end with the oppositely-disposed flattened portions 4 and 4', the former being beveled and in conjunction with the latter forms a sharp cutting edge 4''. The cutting edge 4'' is adapted to bite into the thread of the bolt when the pin 3 is given a thrust from a punch inserted in the channel 2.

A cotter-pin 7 is introduced into the channel 2' and passed along over the rounded end 6 of the pin 3 until its ends 7' protrude from the opposite end of the channel, when they are spread to hold the pin 7 in place. It will thus be seen that the locking-pin 3 is held against endwise movement by its contact with the threads of the bolt 11 at one end and the cotter-pin 7 at the other end.

As an additional holding means for the locking-pin 3 it is provided with a recess 5 in its upper surface, which is adapted to receive the end of a set-screw 10, inserted through the top of the nut and screwed down on the pin to hold the latter tightly in the channel 2. This set-screw 10 may be loosened to relieve its pressure on the pin, so that when the cotter-pin is removed the locking-pin 3 may have a limited reciprocatory movement by reason of its elongated slot 5, and thus the pin 3 will not fall out of the channel 2 and become lost.

The method of applying and locking the nut to the bolt will be readily understood from the following: The nut is screwed onto the end of the bolt until it binds, when the locking-pin 3 is given a blow with an ordinary hand-punch, which causes the sharp edge 4'' of the pin to sink into the threads of the bolt, thereby locking the nut in its binding position. The cotter-pin 7 is then inserted in the channel 2' and shoved past the rounded end 6 of the pin 3 and out of the end of the channel, where its ends 7' are spread, and it is thus held in the nut. The set-screw 10 may now be screwed down on the pin 3 and thereby affording an additional securing means for the locking-pin.

The cotter-pin 7 may be removed and the set-screw 10 loosened, thereby releasing the locking-pin, which when the nut 1 is turned will be shoved back into the channel 2, thus unlocking the nut and allowing it to be turned off of the bolt.

I do not care to limit myself to the exact details of construction and operation as set forth herein, as I may make various changes in the same wholly within the scope of my claims and without departing from the spirit of my invention.

Having thus described my invention, what I claim as new is—

1. The combination with a nut having channels, of a sliding locking-pin having a recess in its upper surface, said pin being movably secured in one of the channels, a set-screw having its end resting in the recess, a cutting edge provided on the locking-pin and adapted to bite into the threads of a bolt to hold the nut thereon, and a cotter-pin fitting in the other channel, substantially as described.

2. In a nut-lock, the combination with a bolt, of a nut having channels therein at angles to one another, a sliding locking-pin having a recess in its upper surface arranged in one of the channels, said pin adapted to bite the threads of the bolt at one end and having a rounded portion at the other end thereof, means adapted to engage the recess in said pin to hold the same, and a locking-pin passing through the other of said channels and adapted to engage the rounded portion of said first-named locking-pin, substantially as described.

In testimony whereof I have hereunto signed my name in the presence of two subscribing witnesses.

HIRAM E. STEVICK.

In presence of—
LOUIS MOESER,
M. E. HARRISON.